(12) United States Patent
Hatanaka et al.

(10) Patent No.: US 7,893,964 B2
(45) Date of Patent: Feb. 22, 2011

(54) IMAGE CORRECTION APPARATUS, METHOD THEREOF AND ELECTRONICS DEVICE

(75) Inventors: Haruo Hatanaka, Kyoto (JP); Hideto Fujita, Yao (JP); Shinpei Fukumoto, Neyagawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 530 days.

(21) Appl. No.: 11/949,168

(22) Filed: Dec. 3, 2007

(65) Prior Publication Data

US 2008/0136931 A1    Jun. 12, 2008

(30) Foreign Application Priority Data

Dec. 6, 2006    (JP) .............................. 2006-329656

(51) Int. Cl.
*H04N 5/228* (2006.01)
(52) U.S. Cl. ................... 348/208.6; 348/222.1
(58) Field of Classification Search ....................... None
See application file for complete search history.

(56) References Cited

U.S. PATENT DOCUMENTS

| | | | |
|---|---|---|---|
| 5,617,176 A | | 4/1997 | Matsuzawa et al. |
| 5,974,201 A | * | 10/1999 | Chang et al. ................ 382/305 |
| 2003/0174216 A1 | * | 9/2003 | Iguchi et al. ............ 348/223.1 |
| 2006/0140599 A1 | * | 6/2006 | Nomura et al. ................ 396/52 |
| 2007/0071346 A1 | * | 3/2007 | Li et al. ........................ 382/254 |
| 2007/0291154 A1 | * | 12/2007 | Moon et al. ............ 348/333.05 |

FOREIGN PATENT DOCUMENTS

| | | |
|---|---|---|
| JP | 62-127976 | 6/1987 |
| JP | 07-253604 A | 3/1995 |
| JP | 2004-088567 | 3/2004 |
| JP | 2006-129236 | 5/2006 |
| JP | 2006-186764 | 7/2006 |

\* cited by examiner

*Primary Examiner*—Lin Ye
*Assistant Examiner*—Dennis Hogue
(74) *Attorney, Agent, or Firm*—Marvin A. Motsenbocker; Mots Law, PLLC

(57) ABSTRACT

In an imaging device that generates a correction image by performing, on the basis of shake information on a target image, shake correction processing on the target image when a correction instruction is issued by a user while the target image is displayed on a display unit, and that displays the corrected image on the display unit, preceding correction performs the shake correction processing before the issuing of the correction instruction. To suppress an increase in power consumption, due to the preceding correction, however, the preceding correction is not performed when the amount of camera shake of a target image is determined to be too small by referring to the amount of shake of a target image. Moreover, the frequency of the issuing of correction instructions for a target image in the past is referenced, and in a case where the frequency is low, the preceding correction is not performed.

9 Claims, 8 Drawing Sheets

IMAGE CORRECTION APPARATUS, METHOD THEREOF AND ELECTRONICS DEVICE

CROSS REFERENCE TO RELATED APPLICATIONS

This application claims priority based on 35 USC 119 from prior Japanese Patent Application No. P2006-329656 filed on Dec. 6, 2006, the entire contents of which are incorporated herein by reference.

BACKGROUND OF THE INVENTION

1. Field of the Invention

The present invention relates to an image correction apparatus and an image correction method for performing correction processing on a target image to generate a corrected image. Furthermore, the present invention relates to an electronics device such as an imaging device including the aforementioned image correction apparatus.

2. Description of Related Art

A camera shake correction technique is a technique that reduces the amount of camera shake at the time of capturing an image, and is viewed as a major differentiation technique for imaging devices such as digital still cameras. Regardless of whether the correction target is a still image or moving image, such camera shake correction technique generally operates via separate individual procedures of detecting camera shake and a second technique for correcting an image on the basis of the detection result.

In the procedure for detecting camera shake, method stapes may include using a sensor such as an angular velocity sensor, an acceleration sensor or the like, and an electronic method of detecting camera shake by analyzing an image. In the image correction technique, method steps may include an optical camera shake correction technique for correcting an image by driving an optical system, and an electronic camera shake correction technique for correcting an image by image processing.

The camera shake correction technique for still images, comprises the methods of detecting camera shake by use of a sensor and then performing optical camera shake correction on the basis of the detection result, a method of detecting camera shake by use of a sensor and then performing electronic camera shake correction on the basis of the detection result, and a method of detecting camera shake by analyzing an image and then performing electronic camera shake correction on the basis of the detection result.

Among these stated methods, a description will be given of the method of detecting camera shake by use of a sensor, and then performing an electronic camera shake correction on the basis of the detection result. In this method, camera shake information is generated in advance by detecting camera shake during image capture. After capturing of the image, a corrected image is generated by reducing, on the basis of the camera shake information, the amount of shake of the image included in the captured image. The camera shake correction based on this procedure often is called an "image restoration type camera shake correction." Various techniques have already been disclosed as techniques related to image restoration type camera shake correction in Japanese Patent Application No. Sho 62-127976 and Japanese Patent Application Laid-open Publications Nos. 2004-88567 and 2006-129236, for example.

Since no drive mechanism for an optical system is necessary, the image restoration type camera shake correction has the advantage of low cost, small size and low power consumption when compared with an optical type correction method. The image restoration type camera shake correction, however, has a demerit of taking longer time for correction. Although dependent of the image size of a correction target image, the correction can require approximately a few seconds, for example, when obtaining a single corrected image via reducing shake from a single correction target image.

A description will be given, with reference to FIG. 10, of the flow of events for generating a corrected image in an imaging device employing a desirable image restoration type camera shake correction. The exemplified imaging device is provided with a display unit and a correction button. In playback mode, a user first checks a captured image (original image) before correction, and thereafter, presses the correction button when necessary. After this button is pressed, the imaging device starts executing camera shake correction processing steps (image restoration processing) and displays a corrected image on a display screen upon completion of the camera shake correction processing.

In this method, the time required for obtaining a corrected image is quite long as mentioned above, so that the user has to wait until the corrected image can be displayed. This problem causes stress from wait time experienced by the user and degrades operability of the imaging device. Accordingly, there is an urgent need for development and improving timing technique.

In addition, Japanese Patent Application Laid-open Publication No. 2006-186764 discloses a technique for temporarily displaying an image obtained by performing camera shake correction on a reduced copy of the image, and performing camera shake correction on the actual captured image while the image based on reduced image is temporarily displayed. The purpose of this technique is to avoid the perception of the correction processing time. This technique, however, is related to the so-called additive-type image stabilization technique, which is quite different from the image restoration type camera shake correction technique. Accordingly, this technique is assumed to be used only in a case where correction is performed immediately after an image is captured. In the additive-type image stabilization technique, a plurality of divided exposure images are continuously captured by making the shutter speed faster. Substantially, a single still image is obtained by adding and synthesizing the plurality of divided exposure images to and with one another.

SUMMARY OF THE INVENTION

As described above, in the image restoration type camera shake correction technique, it is important to reduce the amount of time required for obtaining a corrected image from the issuing of a correction instruction by a user (pressing of a correction button or the like). In addition, the execution of camera shake correction processing requires electricity consumption. Accordingly, in a case where a reduction in the amount of time for obtaining a corrected image involves an increase in power consumption, suppression of the amount of increase in power consumption should be considered.

In this respect, the invention provides an image correction device and an image correction method that contribute to a reduction in the amount of time from the issuance of a correction instruction until a corrected image is obtained. In addition, the present invention aims to contribute to suppressing an increase in power consumption required for the reduction in the amount of time. Furthermore, the present invention aims to provide an electronic device that includes such an image correction device.

An aspect of the invention provides an image correction device that comprises a corrected image generation unit configured to generate a corrected image by correcting for shake, on the basis of shake information on a target image, in accordance with a correction instruction issued to the image correction device; and a correction controller configured to instruct the corrected image generation unit to correct for shake before the correction instruction is issued, wherein the correction controller determines, on the basis of the shake information, whether to perform the preceding correction control for the target image.

The amount of time required to obtain a corrected image from issuing a correction instruction is reduced by allowing execution of the preceding correction control. Moreover, whether the preceding correction should be expected can be appropriately determined by determining whether to perform the preceding correction control on the basis of shake information. Accordingly, an increase in power consumption can be suppressed via the preceding correction.

Another aspect of the invention provides an electronics device that comprises a corrected image generation unit configured to generate a corrected image by correcting for shake, on the basis of shake information on a target image, in accordance with a correction instruction issued to the image correction device; and a correction controller configured to instruct the corrected image generation unit to correct for shake before the correction instruction is issued; a display unit capable of displaying the corrected image; and a display controller configured to cause the display unit to display the generated corrected image when the correction instruction is issued while the target image is displayed, wherein the correction controller causes, when the target image is displayed, the correction image generation unit to perform the shake correction processing before the correction instruction is issued.

The amount of time required to obtain a corrected image from issuing a correction instruction is reduced by implementation of the preceding correction control. Moreover, the decision to execute the preceding correction can be appropriately determined by determining whether to perform the preceding correction control on the basis of the aforementioned history. Accordingly, an effect of suppressing an increase in power consumption, due to the preceding correction can be obtained.

Still another aspect of the invention provides an image correction method that comprises generating a corrected image from shake information in a target image in accordance with an exogenous correction instruction; executing the shake correction before the correction instruction is issued; and determining, on the basis of the shake information, whether to correct the target image before the correction instruction is issued.

Furthermore, an image for which a correction likely may be issued can be corrected first by prioritization on the basis of shake information. Accordingly, a substantial reduction in the amount of time required for obtaining a corrected image from the issuing of a correction instruction can be expected.

DETAILED DESCRIPTION OF EMBODIMENTS

Figure 1:
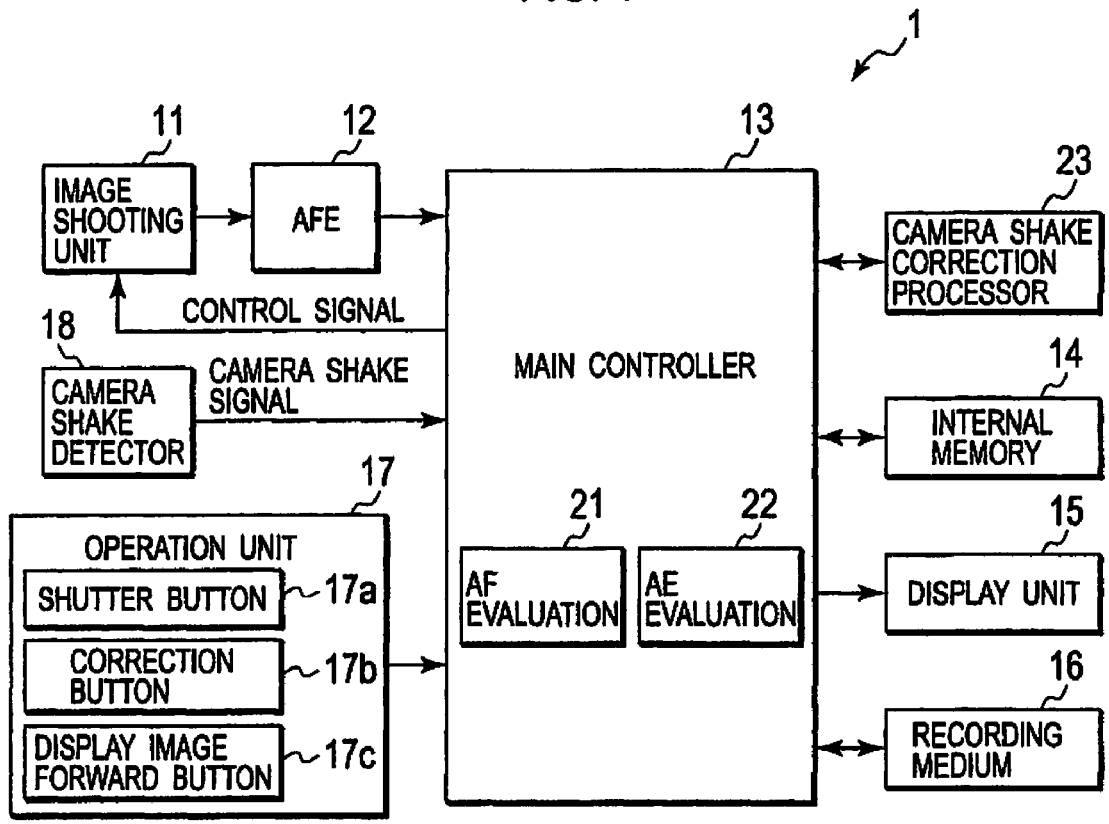
FIG. 1 is an overall block diagram of an imaging device according to an embodiment.

Hereinafter, descriptions are given of an embodiment with reference to the drawings. Regarding the respective drawings to be referenced, the same or similar reference numerals are given to denote the same or similar portions in the drawings, and redundant explanations thereof are omitted in principle.

Descriptions will be given via Examples 1 to 3 later; but common concepts to the used in the examples are described next.

FIG. 1 is an overall block diagram of imaging device 1 according to an embodiment. Imaging device 1 is a digital still camera capable of capturing a still image or a digital video camera capable of capturing both still image and moving image. Since imaging device 1 includes a characteristic function related to camera shake correction processing for still images, hereinafter, descriptions as to still images will be provided unless specified otherwise in this description.

Imaging device 1 includes imaging unit 11, analog front end (AFE) 12, main controller 13, internal memory 14, display unit 15, recording medium 16, operation unit 17, camera shake detector 18 and camera shake correction processor 23. Main controller 13 also includes a mechanism for using the display controller for controlling display content on display unit 15, and performs control necessary for display.

Figure 2:
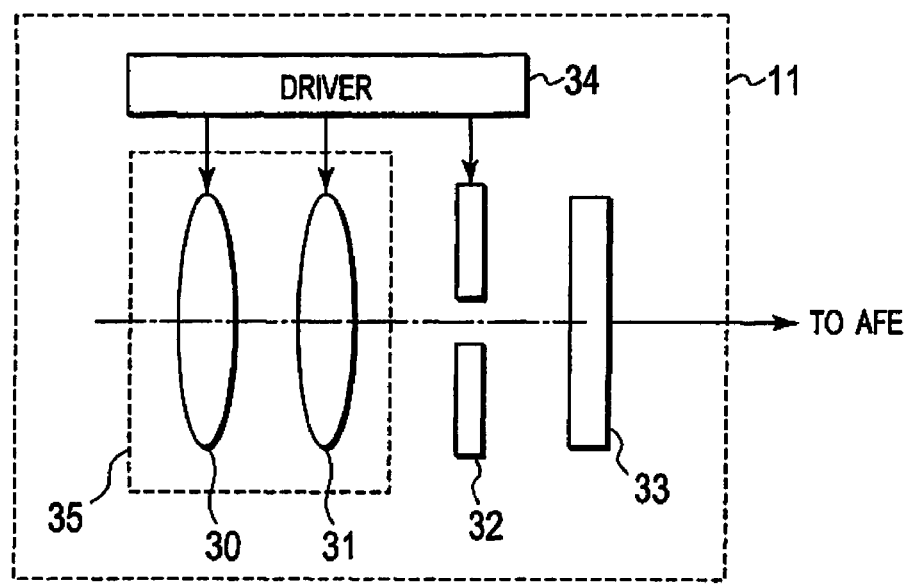
FIG. 2 is an internal configuration diagram of an imaging unit of FIG. 1.

FIG. 2 shows an internal configuration diagram of imaging unit 11. Imaging unit 11 is provided with optical system 35 configured of a plurality of lenses including zoom lens 30 and focus lens 31, aperture 32, imaging element 33 and driver 34. Zoom lens 30 and focus lens 31 are can be moved in an optical axis direction.

Driver 34 is configured of a motor and the like, and controls the movement of zoom lens 30 and focus lens 31 on the basis of a control signal from main controller 13, thereby controlling the zoom factor and the focal distance of optical system 35. In addition, driver 34 controls the degree of opening (the size of the opening) of aperture 32 according to a control signal from main controller 13.

Incident light from a subject enters imaging element 33 through the lenses that constitute optical system 35, and through aperture 32. The lenses constituting optical system 35 form an optical image of the subject on imaging element 33.

Imaging element 33 includes, for example, a CCD (charge coupled devices) image sensor or a CMOS (complementary metal oxide semiconductor) image sensor. Imaging element 33 performs photoelectrical conversion on the optical image entering through optical system 35 and aperture 32, and then outputs the resultant electric signal to AFE 12. More specifically, imaging element 33 includes a plurality of pixels (light receiving pixels; not shown) arranged in a two-dimensional manner in a matrix. When an image is captured, each of the pixels stores therein a signal charge having the amount of charge corresponding to the exposure time. Electrical signals from the pixels, each signal having a size proportional to the amount of charge of the stored signal charge, are sequentially outputted to AFE 12 of the subsequent process in accordance with a driving pulse from a timing generator (not shown).

AFE 12 amplifies an analog signal outputted from imaging unit 11 (imaging element 33), and then converts the amplified analog signal into a digital signal. AFE 12 sequentially outputs the digital signals to main controller 13.

Main controller 13 includes a CPU (central processing unit), a ROM (read only memory), a RAM (random access memory), and the like, and also serves as an image signal processor. Main controller 13 generates, on the basis of the output signal from AFE 12, an image signal representing an image (hereinafter, also referred to as "captured image") captured by imaging unit 11.

Main controller 13 includes AF evaluation value detector 21 configured to detect an AF evaluation value in accordance with the amount of contrast in a focus detection area of a captured image, and AE evaluation value detector 22 configured to detect an AE evaluation value in accordance with the brightness of the captured image. Main controller 13 forms an optical image of a subject on an imaging surface of imaging element 33 by adjusting, through driver 34 in FIG. 2, the position of focus lens 31 in accordance with an AF evaluation value. In addition, main controller 13 controls the brightness of a captured image by adjusting, through driver 34 in FIG. 2, the degree of opening of aperture 32 in accordance with an AE evaluation value.

Internal memory 14 in FIG. 1 is formed of an SDRAM (synchronous dynamic random access memory) or the like and temporarily stores therein various data generated in imaging device 1. Display unit 15 is a display device formed of a liquid crystal display panel and the like, and under the control of main controller 13, displays an image captured in a frame captured most recently or an image recorded in recording medium 16. Recording medium 16 is a non-volatile memory such as an SD (secure digital) memory card, and stores therein a captured image or the like, under the control of main controller 13.

Operation unit 17 is formed of shutter button 17a, correction button 17b, display image forward button 17c and the like and receives an operation from outside. Operation content of operation unit 17 is transmitted to main controller 13. Shutter button 17a is a button for issuing an instruction to capture a still image. Correction button 17b is a button for issuing an instruction to execute camera shake correction processing (details of the processing are to be described later). Display image forward button 17c is a button for changing the image to be displayed on display unit 15.

The operation modes of imaging apparatus 1 include a capturing mode for capturing a still image (and moving image), and a playback mode to reproduce a still image (and moving image) recorded on recording medium 16. The modes are switched in accordance with an operation performed using operation unit 17.

During operation of the capturing mode, imaging unit 11 sequentially captures images in a predetermined frame cycle (1/60 seconds, for example). When shutter button 17a is pressed, imaging unit 11 stores image data, which represents a single captured image that has been subjected to focus processing, in recording medium 16 (specifically, imaging unit 11 causes the image to be stored therein).

This captured image is an image that possibly includes shake due to camera shake and may be corrected later. For this reason, hereinafter, image data stored in recording medium 16 at the time of capturing is referred to as original image data, and a captured image represented by the original image data is referred to as an original image in this description.

Figure 3:
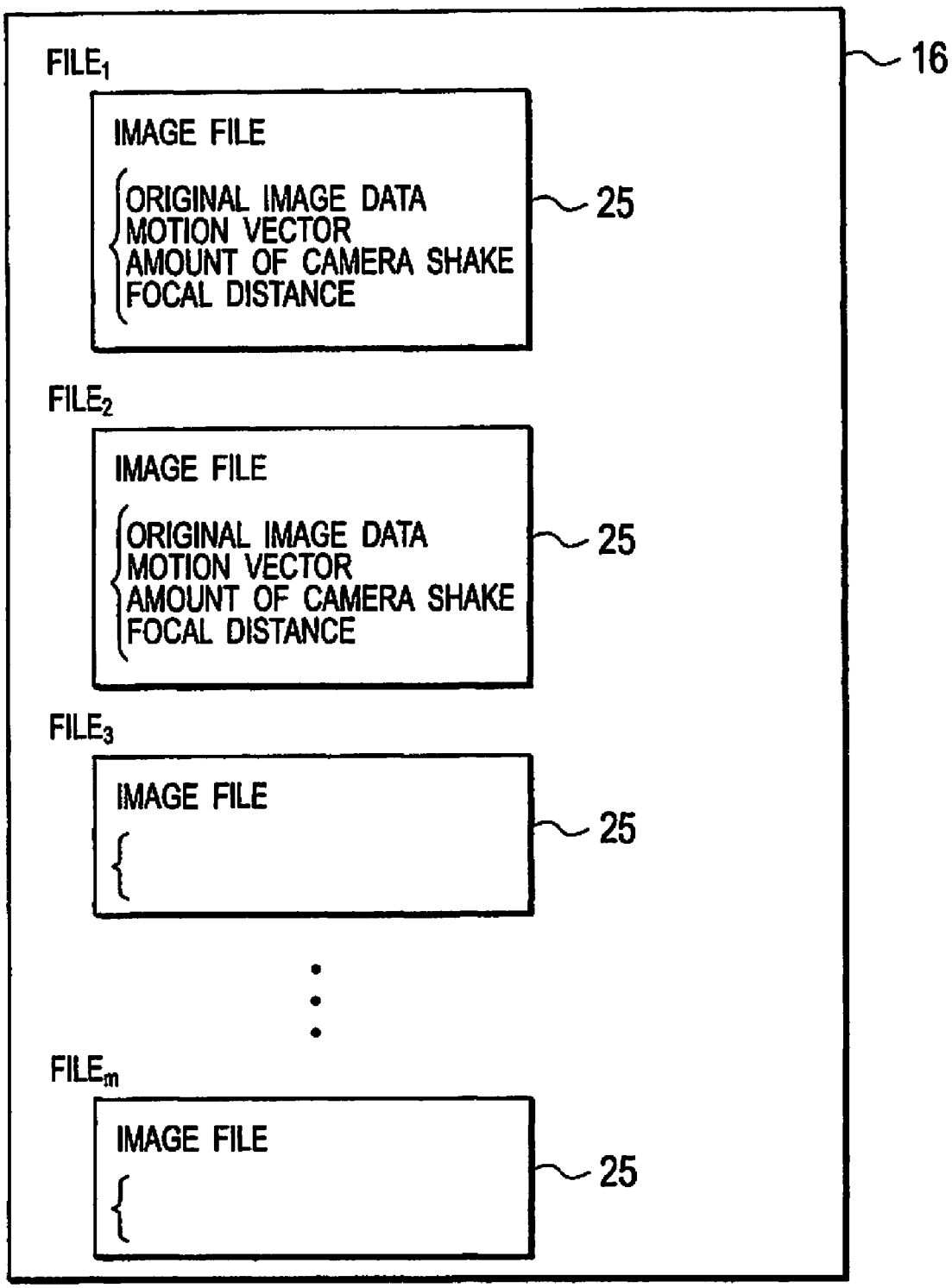
FIG. 3 is a conceptual diagram that shows content stored in a recording medium of FIG. 1.

FIG. 3 is a conceptual diagram showing the content stored in recording medium 16. In recording medium 16, pieces of image files 25 in accordance with the number of times of capturing performed by pressing shutter button 17a are stored. In one image file 25, one piece of original image data and additional information associated with the original image data are stored. The additional information includes information indicating a motion vector at the time of capturing the original image, information indicating the amount of camera shake in the original image (details thereof is to be described later) and information indicating the focal distance of optical system 35 at the time of capturing the original image.

A file name is given to each image file 25, and different file names are given to different image files 25. In this example, suppose that the first, the second, the third, ..., and the m-th original images are captured in this order, and file names $FILE_1$, $FILE_2$, $FILE_3$, ..., $FILE_m$ are given to image files 25 of the first, the second, the third, ..., and the m-th original images (provided that, m is an integer not less than 2), respectively. The m-th original image corresponding to file name $FILE_m$ is the most recently captured original image.

A motion vector at the time of capturing an original image is generated on the basis of a camera shake signal generated by camera shake detector 18 in FIG. 1. The motion vector specifies the amount and direction of shake included in the original image.

[Generation of Motion Vector]

Figure 4:
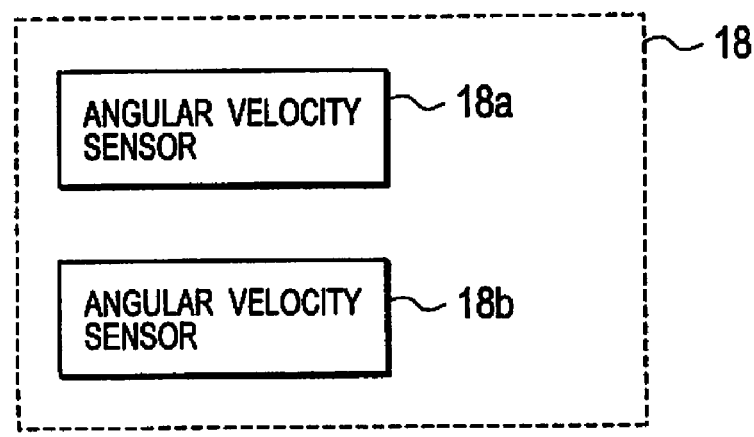
FIG. 4 is an internal configuration diagram of a camera shake detector of FIG. 1.

A description will be given of a technique for generating a motion vector corresponding to a single original image. Camera shake detector 18 is formed of angular velocity sensors 18a and 18b as shown in FIG. 4. Angular velocity sensor 18a detects an angular velocity of imaging device 1 in a pan direction (horizontal direction). On the other hand, angular velocity sensor 18b detects an angular velocity of imaging device 1 in a tilt direction (vertical direction). The pan direction and tilt direction are orthogonal to each other and also to an optical axis. The pan direction corresponds to the horizontal direction of an image and the tilt direction corresponds to the vertical direction of the image.

During a period from the beginning of capturing an original image until the end of capturing the original image, that is, during the period of exposure for capturing the original image, angular velocity sensor 18a measures an angular velocity in the pan direction in a predetermined sampling cycle (the length of one cycle is denoted by dt). Then, angular velocity sensor 18a outputs angular velocity data that represents the measured angular velocity. During the same period of exposure, angular velocity sensor 18b measures an angular velocity in the tilt direction in a predetermined sampling cycle dt and then outputs angular velocity data, which represents the measured angular velocity.

The angular velocity in the pan direction, represented by the angular velocity data outputted by angular velocity sensor 18a, is denoted by $\theta_x'$. A rotation angle in the pan direction in one sampling cycle dt is denoted by θx (in unit of (degree)). Then, suppose that imaging device 1 rotates during this sampling cycle dt at a constant angular velocity, the following formula (1a) is true. Here, a sampling frequency is denoted by f, and f=1/dt (in unit of (Hz)) is true. In addition, suppose that an angular velocity in the tilt direction, represented by the angular velocity data outputted by angular velocity sensor 18b is denoted by $\theta_y'$, and also a rotation angle in the tilt direction in one sampling cycle dt is denoted by θy (in unit of (degree)), the following formula (1b) is true.

$$\theta_x = \theta_x'/f \quad (1a)$$

$$\theta_y = \theta_y'/f \quad (1b)$$

Assuming that r (in unit of (mm (millimeter))) is a focal distance at 35 mm film camera conversion. The distance dx in a horizontal direction on an image by rotation angle θx and distance dy in a vertical direction on the image by rotation angle θy are then found as shown in the following formulae (2a) and (2b).

$$dx = r \cdot \tan \theta_x \quad (2a)$$

$$dy = r \cdot \tan \theta_y \quad (2b)$$

Distances dx and dy represent the magnitude of camera shake in the pan (horizontal) and tilt (vertical) directions at 35 mm film camera conversion, respectively, and the units of dx and dy are in millimeters. In 35 mm film camera conversion, the width and height of an image are defined as 36 mm and 24 mm, respectively. Accordingly, the number of pixels corresponding to the width of and the number of pixels of the height of an original image are respectively set to be X and Y, initially. In addition, the amount of shake in the horizontal direction by rotation angle θx is denoted by x (pixel) and the amount of shake in the vertical direction by rotation angle θy is denoted by y (pixel). In this case, the following formulae (3a) and (3b) are true.

$$x = dx \cdot (X/36) = r \cdot \tan \theta_x \cdot (X/36) = r \cdot \tan(\theta_x'/f) \cdot (X/36) \quad (3a)$$

$$y = dy \cdot (Y/24) = r \cdot \tan \theta_y \cdot (Y/24) = r \cdot \tan(\theta_y'/f) \cdot (Y/24) \quad (3b)$$

By use of formulae (3a) and (3b), angular velocity data can be converted into a motion vector that indicates shake of an image. A motion vector is a two-dimensional amount, which represents the motion of an image as a vector. The horizontal component and vertical component of one motion vector are denoted by x and y, respectively.

The number of motion vectors for an original image, equal to the number of pieces of angular velocity data to be sampled during the period of exposure of the original image can be obtained. Then, by connecting start points and end points of the obtained motion vectors sequentially, a trajectory of camera shake on the image can be obtained. In addition, the size of a motion vector represents the velocity of camera shake at a time point of sampling corresponding to the motion vector.

Figure 5A:
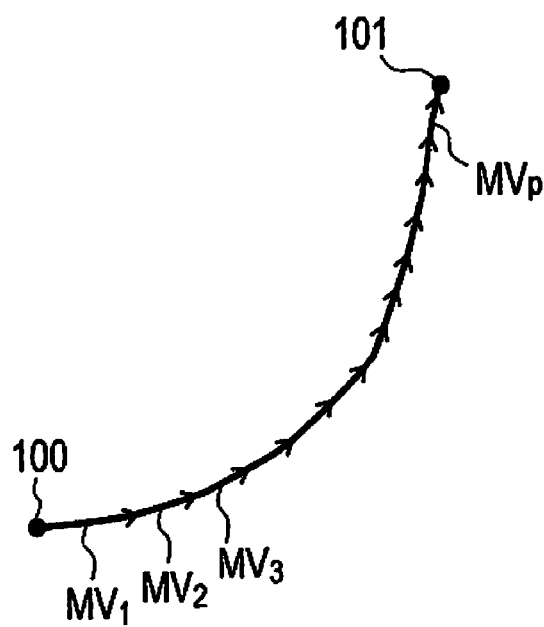
FIG. 5A shows a trajectory of camera shake on an image related to an imaging device of FIG. 1.

FIG. 5A shows an example of a trajectory of camera shake on an obtained image. In FIG. 5A, the reference numerals $MV_1, MV_2, \ldots, MV_p$ denote motion vectors specified by the first, the second, . . . , the p-th angular velocity data, respectively (provided that p is an integer not less than 2) during the period of exposure of the original image. Reference numeral 100 denotes the start point of motion vector $MV_1$ on the image. Reference numeral 101 denotes the end point of motion vector $MV_p$ on the image. On the image, the end point of motion vector $MV_1$ is connected to the start point of motion vector $MV_2$, and the end point of motion vector $MV_2$ is connected to the start point of $MV_3$. Likewise, the start points and end points of the other motion vectors are connected sequentially. Thereby, the trajectory of camera shake, connecting start point 100 to end point 101 is obtained.

The distance from start point 100 to end point 101 on the image represents the amount of camera shake that occurred at the time of capturing the original image. This amount of camera shake represents the amount of shake that is caused by the camera shake, which is included in the original image. The aforementioned distance, the amount of camera shake and the amount of shake of the image are expressed in units of pixels.

Meanwhile, when shutter button 17a is pressed, main controller 13 finds the focus lens position by performing focus processing. Then, after locating the position of focus lens 31 at the focus lens position, main controller 13 causes capture of the original image. When shutter button 17a is pressed, for example, AF evaluation values are sequentially calculated by AF evaluation value detector 21 while the position of focus lens 31 is moved in predetermined intervals. Then, the position of focus lens 31 at which the AF evaluation value becomes the maximum is specified as the focus lens position. When the focus lens position is specified, a focal distance of optical system 35 of imaging unit 11 is automatically determined. This focal distance is associated with the original image data and stored in image file 25, which stores the original image data.

Angular velocity data outputted from angular velocity sensors 18a and 18b are transmitted to main controller 13 as camera shake signals. Main controller 13 generates a motion vector on the basis of the camera shake signals and the focal distance of optical system 35 at the time of capturing the original image. At this time, main controller 13 refers to information (X and the like) other than the camera shake signals and focal distance as known information, the information being necessary for generating a motion vector. Motion vectors during the period of exposure, that is, during the capturing of an original image, are associated with the original image and stored in image files 25, which store the original image. In addition, the amounts of camera shake that are calculated on the basis of the motion vectors during the period of exposure of the original image are also stored in the image files 25.

It should be noted that motion vectors obtained as to an original image may be converted into a point spread function (hereinafter, referred to as PSF), and then the amount of camera shake may be calculated from the point spread function. An operator or spatial filter weighted in accordance with a trajectory drawn on an image by an ideal point image due to shake of imaging device 1 is termed as a PSF, and is generally used as a mathematical model of camera shake.

Figure 5B:
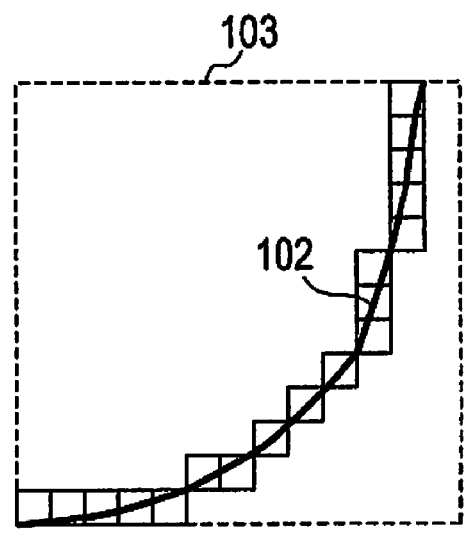
FIG. 5B is a diagram that shows a point spreading function corresponding to the trajectory of the camera shake.

Since the technique for converting motion vectors into a PSF is known, detailed descriptions thereof are omitted here. The technique disclosed in Japanese Patent Application Laid-open Publication No. 2006-129236 may be used for converting motion vectors into a PSF. Specifically, on the basis of motion vectors, elements to which weights of PSF are added (specifically, elements to which non-zero significant weights are added) are determined, and the weights to be added to the respective elements are determined. Thereby, a PSF is obtained. FIG. 5B shows an obtained PSF. Non-zero significant weights are respectively added to elements with each indicated by a solid line square frame along camera shake trajectory 102 and weighting for elements other than those elements are to be zero. Then, in the PSF, the minimum rectangle (broken line rectangle 103 in FIG. 5B) including all the elements to which weights are added is found. Then, the length of the diagonal line of the rectangle is calculated as the amount of camera shake. The amount of camera shake found from a PSF and the amount of camera shake corresponding to the distance between start point 100 and end point 101 in FIG. 5A are equivalent.

In playback mode, imaging device 1 according to the present embodiment includes a function to execute camera shake correction processing for an original image and to display a corrected image obtained by the processing on display unit 15. The camera shake correction processing is executed by camera shake correction processor 23 in FIG. 1. Normally, this camera shake correction is performed by pressing correction button 17b in FIG. 1. Main controller 13, however, can execute "preceding correction control that causes camera shake correction processor 23 to execute (to start execution) the camera shake correction processing in advance of the pressing of correction button 17b." Hereinafter, the camera correction process to be executed before the pressing of correction button 17b is referred to as "preceding correction," and the function to perform the preceding correction is referred to as a "preceding correction function." Main controller 13 includes a function serving as a correction controller configured to control the execution of camera shake correction processing including the preceding correction, performed by camera shake correction processor 23.

A corrected image is an image obtained by removing or reducing image shake of an image included in an original image. Since the technique (image restoration type camera shake correction) for obtaining a corrected image from an original image by use of camera shake correction processing is known, detailed descriptions thereof are omitted here. Any one of the techniques described in Japanese Patent Application No. Sho 62-127976 and Japanese Patent Application Laid-open Publications Nos. 2004-88567 and 2006-129236 may be used, for example. In the examples of the present embodiment, the camera shake correction processing with respect to an original image is executed on the basis of motion vectors (shake information) stored in respective image files 25 as to the original image. On the basis of the motion vectors, a PSF serving as an image deterioration function is generated as described in Japanese Patent Application Laid-open Publication No. 2006-129236, and then, a corrected image can be obtained by filtering the original image by use of this PSF, for example.

Hereinafter, as an example focusing on preceding correction function, descriptions will be given of Examples 1 to 3. Descriptions provided for a certain example can be applied to the other examples unless there is a contradiction. It should be noted that in a case where a word "display" is simply used in the descriptions of the present embodiment, the word indicates display on display unit 15.

Example 1

First, Example 1 will be described. If the preceding correction is performed on all of the original images stored in recording medium 16, the correction leads to an increase in power consumption of imaging device 1. In addition, when a large number of corrected images obtained by the preceding correction are to be stored, the required memory capacity also increases. For these reasons, in Example 1, a prediction is made on whether a correction instruction is issued for a displayed original image, and the preceding correction is performed only when it is determined that the probability that a correction instruction is issued is high. The correction instruction is issued when correction button 17b is pressed. Here, "the issuing of correction instruction" and "the pressing of correction button 17b" have the same meaning.

Figure 6:
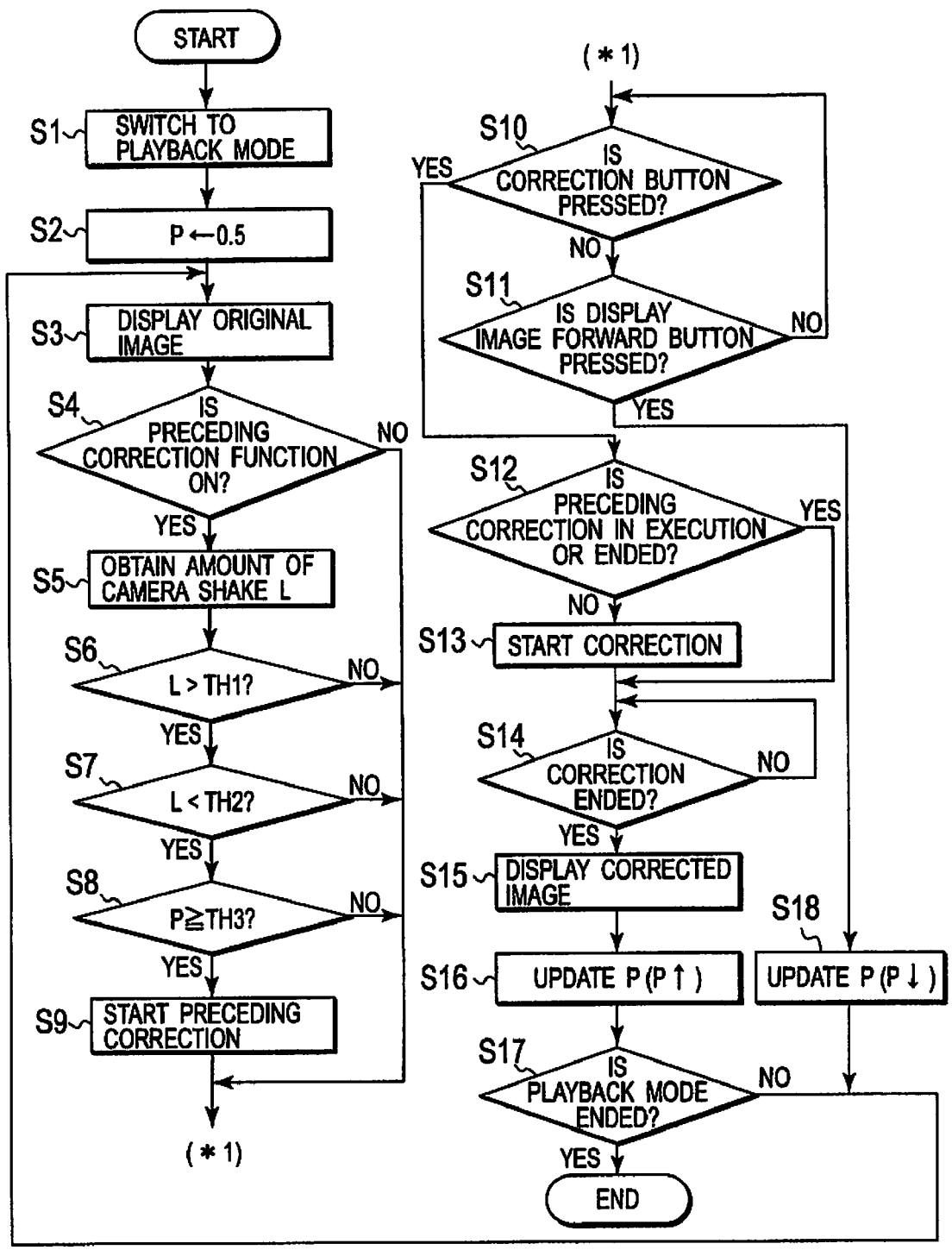
FIG. 6 is a flowchart showing an operation in playback mode of an imaging device according to Example 1.

A description will be given with reference to FIG. 6. FIG. 6 shows a flowchart of an operation, in playback mode, of imaging device 1 according to Example 1.

When the operation mode of imaging device 1 switches to playback mode (step S1) after a plurality of image files 25 are stored in recording medium 16 as shown in FIG. 3 during capturing mode, 0.5 is assigned to correction probability variable P in step S2.

In subsequent step S3, main controller 13 reads a necessary original image from recording medium 16 and causes the original image to be displayed on display unit 15. In the case where the operation of imaging device 1 proceeds to step S3 for the first time after switching to playback mode, the original image obtained by the latest capturing is read and then displayed. Specifically, original image data in image file 25 with file name $FILE_m$ is read and the original image represented by the original image data is displayed on display unit 15.

In step S4 subsequent to step S3, main controller 13 checks whether the preceding correction function is on. The preceding correction function can be turned on or off by performing a predetermined operation on operation unit 17. It should be noted that in this case, operation unit 17 serves as an instruction reception unit for receiving an instruction to prohibit or to allow the execution of the preceding correction.

In the case where the preceding correction function is off, the operation moves to step S10, and waits for the pressing of correction button 17b or a display image forward instruction by the user. In the case where the preceding correction function is on, the operation moves to step S5, and main controller 13 obtains, from image file 25, the amount of camera shake as to the original image being currently displayed. The obtained amount of camera shake denoted as L is in "pixel" units.

In step S6 subsequent to step S5, main controller 13 compares the amount of camera shake L with threshold value TH1 as to the minimum amount of camera shake. As threshold value TH1, a predetermined default value (three pixels, for example) is originally set. Then, in a case where inequality expression "L>TH1" is true, the operation moves to step S7. Meanwhile, in the case where the inequality expression is not true, the operation skips the steps for performing the preceding correction and moves to step S10. This is because the amount of shake of the image included in the original image is so small when the amount of camera shake L is not greater than threshold value TH1, that even if camera shake correction processing is performed on the original image, a visibly recognizable correction effect can be hardly obtained.

In step S7, main controller 13 compares the amount of camera shake L with threshold value TH2 as to the maximum amount of camera shake. Threshold value TH2 is previously defined in accordance with performance of the camera shake correction processing performed by camera shake correction processor 23. In the case where TH2>TH1 is true, threshold value TH2 is set to 100 pixels, for example. In the case where an inequality expression "L<TH2" is true, the operation moves to step S8. In the case where "L<TH2" is not true, the operation skips the steps for performing the preceding correction, and moves to step S10. This is because the amount of shake of the image included in the original image is considered to be so large when the amount of camera shake L is not less than threshold value TH2, that even if the camera shake correction processing is performed on the image, effective camera shake correction cannot be achieved.

In step S8, main controller 13 compares correction probability variable P with threshold value TH3. In threshold value TH3, a predetermined default value (0.5, for example) is previously set. As it will be clear in descriptions to be provided later, correction probability variable P represents a probability that a user causes a corrected image to be displayed on display unit 15 by pressing correction button 17b.

The probability changes according to passed conditions of the pressing of correction button 17b. In the case where inequality expression "P≧TH3" is true, the operation moves to step S9. In the case where the inequality expression "P≧TH3" is not true, the operation skips step S9 for performing the preceding correction and moves to step S10. This is because in the case where correction probability variable P is less than threshold value TH3, the probability that the user presses correction button 17b is predicted to be low.

It should be noted that it is possible to change threshold values TH1 and TH3 individually and optionally by an operation on operation unit 17. It should be noted that a value not less than threshold value TH2 cannot be set to threshold value TH1.

When the operation moves from step S8 to step S9, regardless of whether correction button 17b is pressed, the preceding correction for the original image currently being displayed on display unit 15 is started. Specifically, under the control of main controller 13, camera shake correction processor 23 starts the execution of camera shake correction processing for obtaining a corrected image from the original image. After the preceding correction is started, the operation moves to step S10.

In step S10, main controller 13 checks whether correction button 17b is pressed, and moves to step S12 in a case where the correction button 17b is pressed, and checks whether the preceding correction is in execution or the preceding correction is ended. Specifically, main controller 13 checks whether the preceding correction is started in step S9, and is still in execution or ended. In the case where the preceding correction is in execution or ended, the operation moves directly to step S14 from step S12, and otherwise, the operation moves to step S13, and main controller 13 causes the execution of camera shake correction processing for the original image currently being displayed to be started and thereafter, the operation moves to step S14.

In step S14, main controller 13 checks whether the camera shake correction processing started in step S9 or step S13 is ended, and in the case where the camera shake correction processing is not ended, main controller 13 repeats the processing in step S14. On the other hand, in the case where the processing started in step S9 or step S14 is ended, the operation moves to step S15. As the camera shake correction processing is ended, a corrected image is generated, and this corrected image (corrected image data representing the corrected image) is temporarily stored in internal memory 14.

In internal memory 14, a memory area for storing a corrected image is provided, and in Example 1, the memory area is capable of storing only a single corrected image, for example. Accordingly, in the case where a corrected image is newly generated, a previously generated corrected image is deleted from internal memory 14. As a matter of course, the size of the memory area for storing a corrected image may be increased in order that a plurality of corrected images can be stored therein.

In step S15, main controller 13 causes the corrected image temporarily stored in internal memory 14 to be displayed on display unit 15. Thereafter, in step S16, main controller 13 causes the fact that the correction instruction is issued for the original image being displayed this time to be reflected in correction probability variable P (after increasing the value of P), then moves to step S17 and waits for an instruction from the user.

In addition, in step S10, in the case where it is determined that correction button 17b is not pressed, the operation moves to step S11, and main controller 13 checks whether display image forward button 17c is pressed. In the case where display image forward button 17c is not pressed, the operation returns to step S10. Alternatively, in the case where display image forward button 17c is pressed, the operation moves to step S18. At this time, in the case where the preceding correction is in execution, the preceding correction is interrupted.

In step S18, the operation returns to step S3 after the fact that a correction instruction for the original image displayed this time is not issued (specifically, correction button 17b is not pressed) is reflected in correction probability variable P (the value of P is decreased). Then, an original image different from the original image currently being displayed is newly displayed on display unit 15. In the case where an original image corresponding to file name $FILE_m$ has been displayed, an original image corresponding to file name $FILE_{m-1}$ is displayed.

In the case where display image forward button 17c is pressed in step S17, the operation similarly returns to step S3, and an original image different from the original image that is the base of the corrected image currently being displayed (original image corresponding to file name $FILE_{m-1}$, for example) is displayed on display unit 15. Thereafter, the processing of each of aforementioned steps is to be executed for the newly displayed original image. In the case where an instruction to turn off playback mode is issued in step S17, the processing shown in FIG. 6 is ended.

As described above, the plurality of original images stored in recording medium 16 are sequentially treated as target images of the camera shake correction processing. Then, main controller 13 determines whether the preceding correction is to be performed on each of the target images (refer to steps S6 to S8).

A description as to correction probability variable P will be added. In the case where, among ten original images for probability evaluation purpose, the number of original images for which a correction instruction is issued is defined as $P_A$, P can be expressed by $P=P_A/10$. The ten original images for probability evaluation purpose correspond to ten original images displayed on display unit 15 most recently. Accordingly, a corrected image is not included in the original images for probability evaluation purpose. In addition, in the case where a certain original image is displayed twice or more while another original image is displayed between the displaying of the certain original image, the certain original image displayed for the second or subsequent time is excluded from the original images for probability evaluation purpose. This is due to the possibility that the same original image may be displayed more than once by taking the pressing of display image forward button 17c (by the pressing of left and right keys interchangeably) into consideration.

For example, when original images are displayed in the order of "the first, the second, the third, the fourth, the fifth, the sixth original images, a corrected image corresponding to the sixth original image, the seventh, the eighth, the seventh, the eighth, the ninth, the tenth, and the eleventh original images," correction probability variable P in the processing of step S8 for the eleventh original image is calculated by treating the first to the tenth original images as ten original images for probability evaluation purpose, and the value of probability correction variable P is 1/10. It should be noted that the value ten representing the number of original images is an exemplification as a matter of course, and the value may be a value other than ten.

Figure 7:
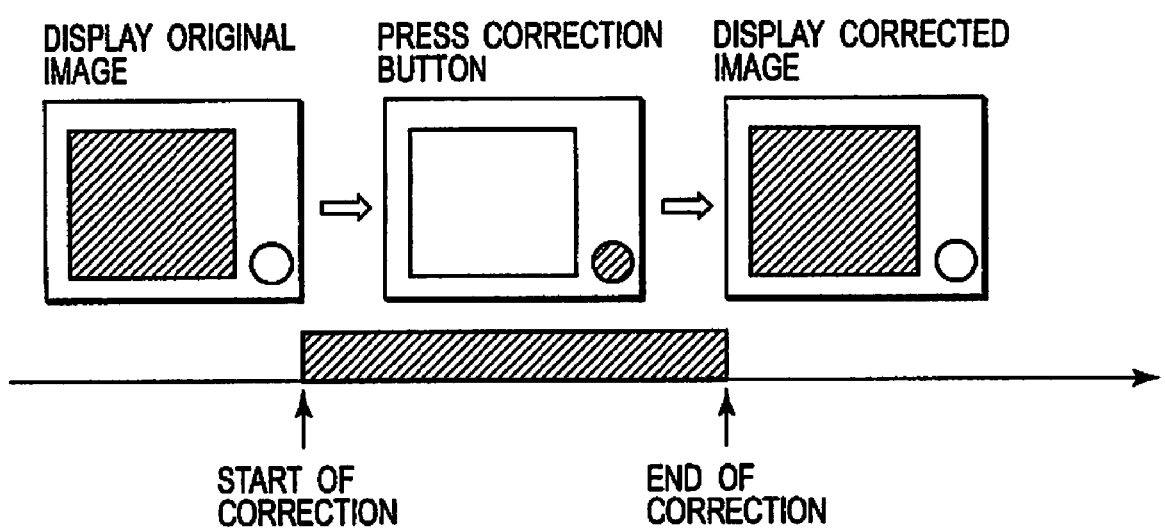
FIG. 7 is a conceptual diagram that shows the flow of generating a corrected image in the imaging device according to Example 1.

As described above, since the camera shake correction processing is executed after the pressing of a correction button in the case of a conventional imaging device, a long time is required for displaying a corrected image from the issuing of a correction instruction. On the other hand, according to Example 1, when an original image is displayed, the preceding correction is executed for the original image before a correction instruction is issued (here, whether to execute the preceding correction depends on the amount of camera shake L and correction probability variable P). For this reason, the waiting time for obtaining a corrected image can be significantly reduced as shown in FIG. 7, and the operability of the imaging device can be improved.

In addition, as to a concern for an increase in power consumption due to the preceding correction, the preceding correction is not unconditionally performed for all of the original images, but is performed only in the case where the probability that a correction instruction is issued is predicted and is determined to be high. Thereby, an effect of suppressing an increase in power consumption can be obtained. As described above, this determination is made on the basis of the amount of camera shake L and correction probability variable P.

Normally, a user checks the state of camera shake of an original image on a display screen first, and then issues a correction instruction according to the checked state. For this reason, whether a correction instruction is issued is predicated on the basis of the amount of camera shake L by including step S6 in the operation, and thus, whether to perform the preceding correction is determined. In addition, since the camera shake correction processing may not effectively function for an image having an abnormally large amount of camera shake, step S7 is also included in the operation.

Moreover, when correction instructions are frequently issued for the original image displayed most recently, the possibility that a correction instruction is issued for the original image currently displayed is also high. Taking this factor into consideration, correction probability variable P is introduced in the operation to determine whether to perform the preceding correction, as mentioned above.

It should be noted that any one or two steps of steps S6, S7 and S8 can be omitted. When step S6 is omitted, for example, the operation moves directly to step S7 from step S5. In the case where one of steps S7 and S8 is omitted, the operation moves in the same manner.

Additionally, on executing camera shake correction processing, a moving image (a progress bar indictor, for example) indicating the remaining amount of time (or an estimation of the remaining time) until the generating of a corrected image is completed and may be displayed.

In addition, although an example is shown in the flowchart of FIG. 6 in which an original image is displayed first, and then the preceding correction for the original image is executed after the processing of steps S4 to S8 are performed, the original image can be displayed during the processing of steps S4 to S8, or immediately after the processing of step S9. In other words, it is preferable that the execution of the camera shake processing by the preceding correction is started (here, whether to execute camera shake correction processing depends on the amount of camera shake L or the like) at the same period of time as that of the displaying of the original image on display unit 15, the original image being a target image for the preceding correction (in other word, in synchronization with the displaying of the original image). The term "same period of time" herein is a concept including some degree of time width.

Moreover, threshold value TH1 used in step S6 may otherwise be updated in the following manner. Assume that the current state of the operation is after repeated execution of the processing of respective steps in FIG. 6. In this case, for example, threshold value TH1 is updated and set on the basis of the amount of camera shake L as to the original image immediately before, to which a correction instruction has been issued (threshold value TH1 is set to be a value obtained by subtracting a predetermined value from the amount of camera shake L of this image, for example). Otherwise, for example, threshold value TH1 may be updated and set on the basis of an average value as to the amounts of camera shake of a plurality of most recent original images to which correction instructions have been issued.

The minimum amounts of camera shake of an image causing a user to consider issuing a correction instruction vary among individuals. Some users, for example, do not mind camera shake of an image even when the amount of camera shake is 20 pixels. When the value of threshold value TH1 is kept low (three pixels, for example) for such users, power is wastefully consumed since the preceding correction is unnecessarily performed. With this respect, the value of threshold value TH1 is updated and set on the basis of the amount of camera shake of an original image which has been displayed and for which a correction instruction has been issued in the past. Thereby, the most appropriate determination on whether to execute preceding correction can be made for each user and a further effect of suppressing an increase in power consumption can be expected.

Example 2

Incidentally, in the case where the period of time from the display of an original image until the issuing of a correction instruction by a user is short, there is not enough time for the camera shake correction processing by the preceding correction to be performed. Thus a relatively longtime is required for the corrected image to be displayed after issuance of a correction instruction. As an example of improvement this problem, Example 2 will be described.

In Example 2, the preceding correction is performed for a plurality of original images, and then, a plurality of resultant corrected images are stored temporarily in internal memory 14. Then, in accordance with the pressing of correction button 17b, a desired corrected image is displayed. Note that performing the preceding correction for all of the original images stored in recording medium 16 increases power consumption and required memory capacity for temporarily storing corrected images. For this reason, the preceding correction is performed, by priority, for original images each predicted to have a high probability of being issued a correction instruction in the near feature.

Figure 8:
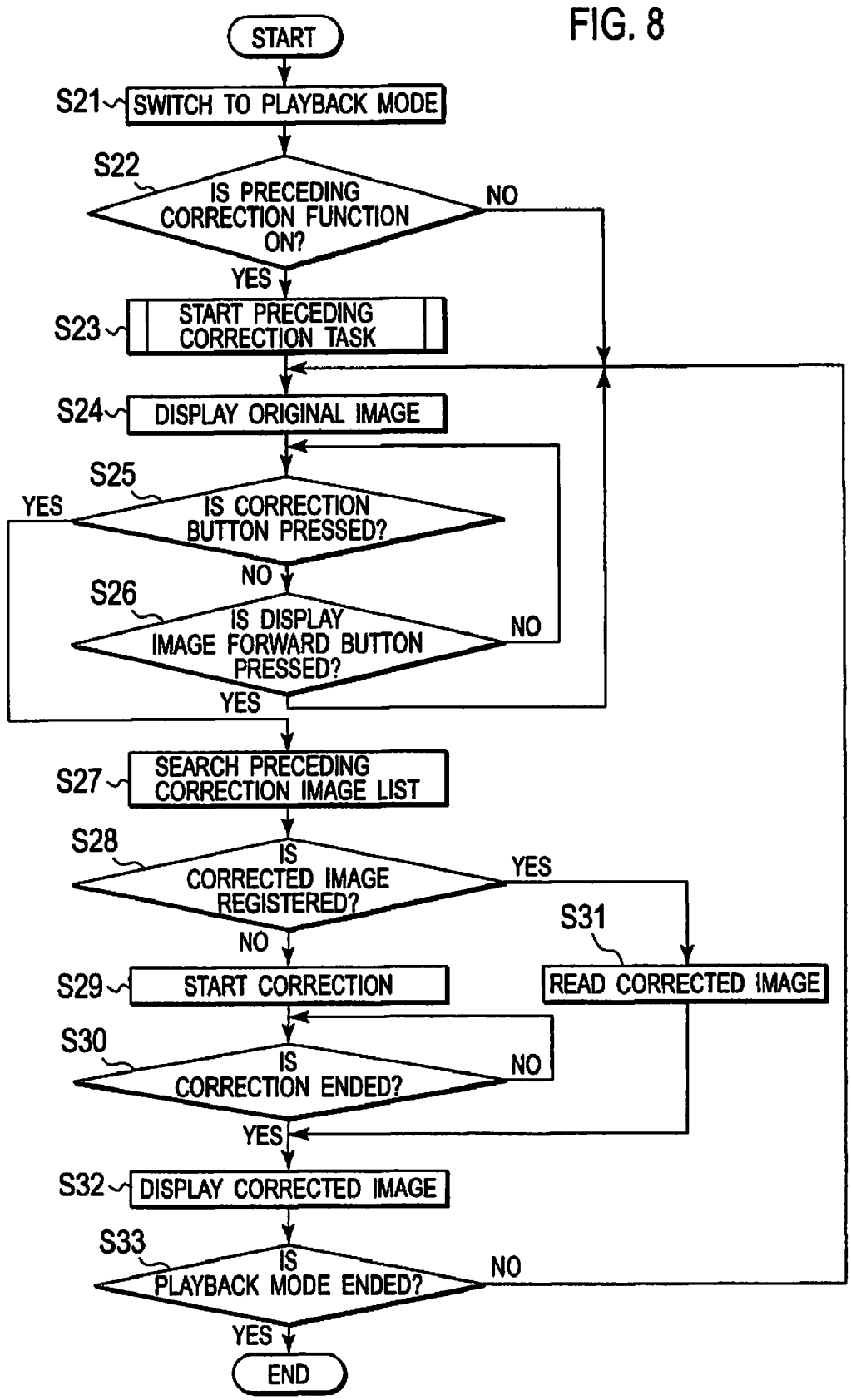
FIG. 8 is a flowchart showing an operation (main task), in playback mode, of an imaging device according to Example 2.

Example 2 will be described in detail with reference to FIG. 8. FIG. 8 is the flowchart of an operation, in playback mode, of imaging device 1 according to Example 2.

When the operation mode is switched to playback mode after a plurality of image files 25 are stored, as shown in FIG. 3, in recording medium 16 in capturing mode (step S21), main controller 13 checks whether the preceding correction function is on, in step S22.

In the case where the preceding correction function is turned off, the operation moves to step S24 and waits for the pressing of correction button 17b (on that is, the issuing of a correction instruction) or a display image forward instruction by a user. In the case where the preceding correction function is on, the operation moves to step S23 and main controller 13 starts the preceding correction task. This preceding correction task is executed in parallel with a main task formed of steps S21 to S33 shown in FIG. 8.

Figure 9:
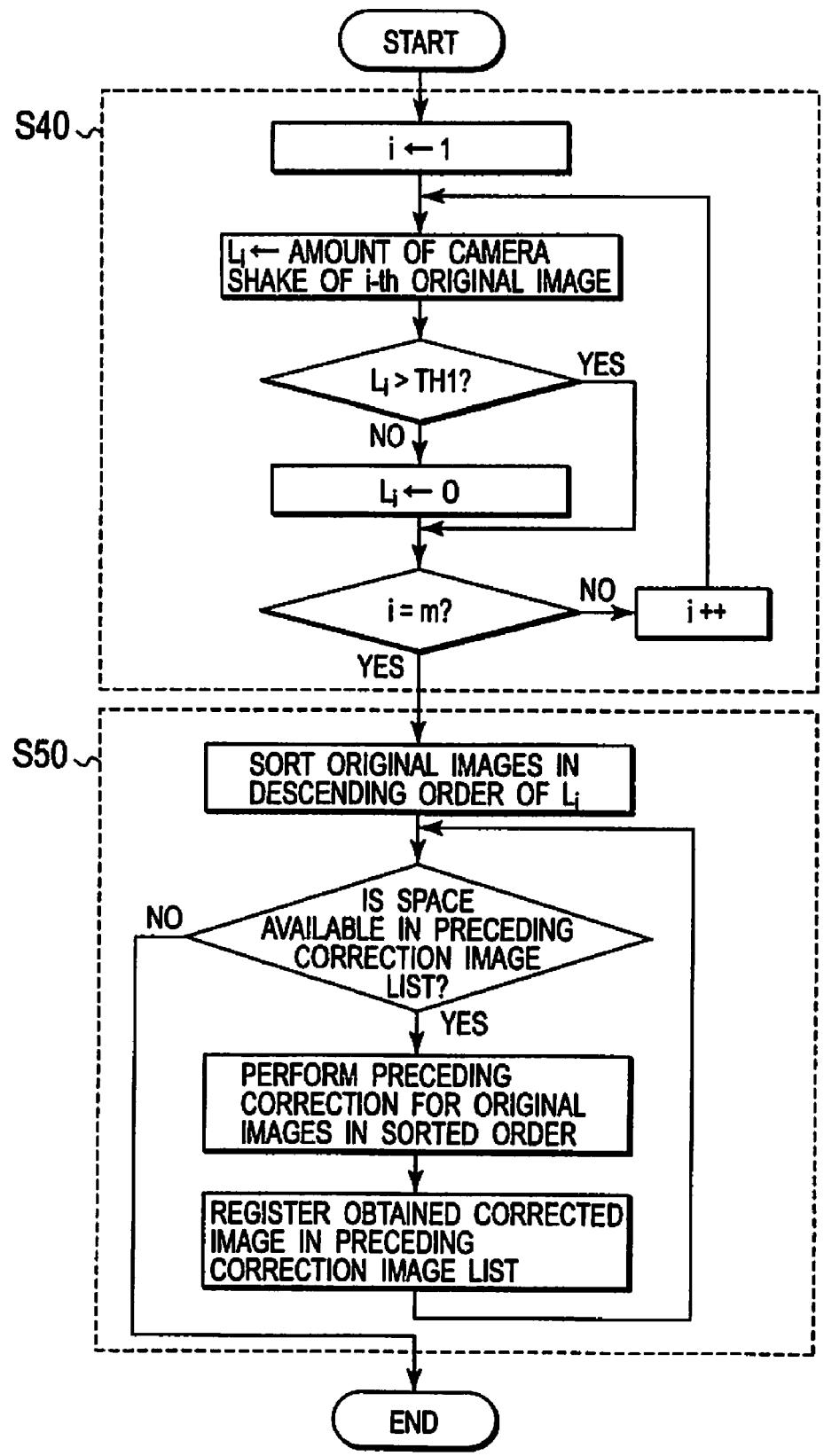
FIG. 9 is a flowchart showing an operation (preceding correction task), in playback mode, of the imaging device according to Example 2.
Figure 10:
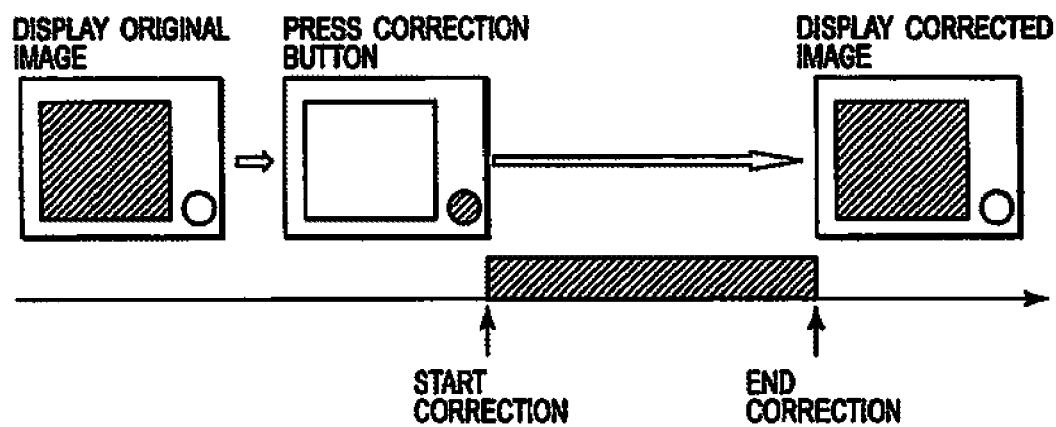
FIG. 10 is a conceptual diagram showing the flow of generating a corrected image in a conventional imaging device.

FIG. 9 shows a flowchart of the processing of the preceding correction task. As described above, the assumption is made that the first, second, third, . . . , and m-th original images are captured in this sequence, and these original images are recorded in recording medium 16, provided that m is an integer not less than 2. In step S40, main controller 13 defines variables $L_1$ to $L_m$, and obtains the amounts of camera shake as the respective first to m-th original images from recording medium 16. The amounts of camera shake as to the first to m-th original images are respectively assigned to variables $L_1$ to $L_m$. An original image with the camera shake correction processing can be excluded. Then, each of variables $L_1$ to $L_m$ respectively representing the amounts of camera shake, is compared with threshold value TH1. Then, a value, 0, is assigned to variable Li corresponding to the amount of camera shake not greater than threshold value TH1. In the case where the amount of camera shake as to the third original image is not greater than the threshold value TH1, a determination is made that it is not necessary to perform correction for the third original image. Accordingly, 0 is assigned to variable L3.

In Example 2, a preceding correction image list is prepared for temporarily storing a plurality of corrected images obtained by the preceding correction. The preceding correction image list is formed of a memory area having a predetermined memory size secured in internal memory 14 (or recording medium 16). In the preceding correction image list, the corrected images can be stored up to the maximum storing number of images $C_{MAX}$.

Main controller 13 sorts the original images in the descending order of variables $L_1$ to $L_m$ in step S50 that is an operation subsequent to the processing of step S40. In the case where inequality equation "$L_2 > L_4 > L_1 > L_5 > L_3$" is true, provided that m=5, for example, the first to fifth original images are sorted in the order of the second, the fourth, the first, the fifth and the third original images.

Next, main controller 13 checks whether there is available space (available memory area) large enough to store at least one corrected image in the preceding correction image list. In the case where there is available space, main controller 13 performs the preceding correction for the original images in the sorted order. In the case where inequality equation "$L_2 > L_4 > L_1 > L_5 > L_3$" is true, provided that m=5, for example, the preceding correction is sequentially performed in the order of the second, the fourth, the first, the fifth and the third original images, and corrected images sequentially obtained thereby are stored in the preceding correction image list.

A determination is made regarding whether there is available space in the preceding correction image list each time one corrected image is generated. When there is no available space, that is, when corrected images of the maximum stored number of images $C_{MAX}$ occupy the preceding correction image list, the preceding correction task is ended. In the case where the inequality expression, "$L_2 > L_4 > L_1 > L_5 > L_3$" is true, provided that m=5 and $C_{MAX}$=3, when a total of three corrected images sequentially obtained by performing the preceding correction sequentially in the order of the second, the fourth and the first original images is stored in the preceding correction image list, the preceding correction task is ended without performing the preceding correction image for the fifth and the third original images.

Here, returning to the description of the main task, the main task shown in FIG. 8 will be described. After the preceding correction task is started in step S23, main controller 13 reads a necessary original image from recording medium 16 and then causes the read original image to be displayed on display unit 15 in step S24. In the case where the operation proceeds to step S24 for the first time after switching to playback mode, an original image obtained by the latest capturing is read and displayed.

In step S25 subsequent to step S24, main controller 13 checks whether correction button 17b is pressed, and when the button is pressed, the operation moves to step S27, and main controller 13 searches the preceding correction image list if a corrected image as to the original image currently being displayed is registered (stored) in the list. Then, when a correct image is registered in the list (Y in step S28), main controller 13 reads the corrected image from the preceding correction image list (step S31) and causes the corrected image to be displayed on display unit 15 (step S32). On the other hand, when a corrected image is not registered in the preceding correction image list (N in step S28), main controller 13 starts the execution of camera shake correction processing for the original image currently being displayed, and after a corrected image is generated by the processing, causes the corrected image to be displayed on display unit 15 (steps S29, S30 and S32). Thereafter, the operation waits for an instruction from a user in step S33.

In addition, when a corrected image is read from the preceding correction image list (step S31), the read corrected image is deleted from the preceding correction image list, and the preceding correction task is re-started.

Moreover, in the case where it is determined that correction button 17b is not pressed in step S25, the operation moves to step S26, and main controller 13 checks whether display image forward button 17c is pressed. In the case where display image forward button 17c is not pressed, the operation returns to step S25. On the other hand, when display image forward button 17c is pressed, the operation moves to step S24, and an original image different from the original image currently being displayed is newly displayed on display unit 15. When an original image corresponding to file name $FILE_m$ is currently displayed, for example, an original image corresponding to file name $FILE_{m-1}$ is newly displayed.

In a case where display image forward button 17c is pressed in step S33, the operation returns to step S24, and an original image (original image corresponding to file name $FILE_{m-1}$, for example) different from the original image that is the base of the corrected image currently being displayed is newly displayed on display unit 15. It should be noted that in a case where an instruction to turn off playback mode is issued in step S33, the processing shown in FIGS. 8 and 9 is ended.

According to Example 2, the preceding correction is executed first, by priority, for original images each having been predicted to have a large amount of camera shake and a high probability that a user issues a correction instruction. Then, the corrected images obtained by the preceding correction are temporarily stored in the preceding correction image list. Then, if a necessary corrected image is stored in the preceding correction image list when correction button 17b is pressed, the corrected image is immediately displayed. Accordingly, the wait time for obtaining a corrected image is significantly reduced, and the operability of the imaging device can be improved. In addition, since the preceding correction is executed first, by priority, for an original image having a high probability that a user issues a correction instruction, a reduction in the substantial wait time can be expected.

Moreover, instead of unconditionally performing the preceding correction for all of the original images, the preceding correction is performed only for the number of original images not greater than a predetermined number, each of the original images being determined to have a high probability that a user issues a correction instruction. Accordingly, an effect of suppressing an increase in power consumption can be obtained and in the meantime, an increase in a required memory capacity for storing corrected images can be suppressed.

Example 3

Although the original images are sorted only on the basis of the respective amounts of camera shake in Example 2, this sorting may be performed by taking the display sequence of the original images into consideration. An example in which such variation is made is described as Example 3. Example 3 corresponds to an example in which part of Example 2 is modified, and a portion that is not particularly described in Example 3 is the same as that of Example 2.

Assume that display image forward button 17c is formed of left and right buttons (not shown). Then, in the case where the original image currently being displayed is the m-th original image, the original images displayed one by one each time the pressing of the left button is confirmed are updated in the sequence of the (m−1)th, the (m−2)th, the (m−3)th, . . . , of the respective original images. In the meantime, the original images displayed one by one each time the pressing of the right button is confirmed are updated in the sequence of the first, the second, the third, . . . , of the respective original images. Specifically, the sequence in which each of the original images is updated and displayed when display image forward button 17c is pressed depends on a numeric value of sequence number of each of the file names (refer to FIG. 3; "1" in $FILE_1$, for example) added to each of image files 25 having the corresponding original image stored therein.

It is highly possible that a correction instruction will be issued earlier, for an original image shown at an earlier timing by pressing display image forward button 17c. In this respect, a larger weight value is provided to an original image displayed at an earlier timing. The weight value to be provided to the i-th original image is denoted by Wi. In a case where the original image currently being displayed is the m-th original image, the weight values are set to satisfy inequality expressions "$W_m > W_{m-1} > W_{m-2} > W_{m-3} \ldots$" and "$W_m > W_1 > W_2 > W_3 \ldots$".

Then, in step S50 of FIG. 9, the original images are sorted in the descending order of $W_1 \cdot L_1$ to $W_m \cdot L_m$ instead of the original images being sorted in the descending order of variables $L_1$ to $L_m$. In the case where the inequality expression, "$W_2 \cdot L_2 > W_4 \cdot L_4 > W_1 \cdot L_1 > W_5 \cdot L_5 > W_3 \cdot L_3$," provided that m=5, is true, the first to the fifth original images are sorted in the order of the second, the fourth, the first, the fifth and the third original images.

The processing of the preceding correction task after this sorting is the same as that of Example 2. Specifically, main controller 13 checks whether there is available space (available memory area) large enough to store at least one correction image in the preceding correction image list, and in the case where there is enough available space, the preceding correction is performed for the original images in the sorted order. In the aforementioned example, the preceding correction is sequentially performed in the order of the second, the fourth, the first, the fifth and the third original images, and then, the corrected images sequentially obtained are stored in the preceding correction image list. Incidentally, in the case where there is no available space in the preceding correction image list, the preceding correction task is ended.

According to Example 3, since the preceding correction is performed earlier for an original image displayed at an earlier timing, the wait time for obtaining a corrected image is substantially reduced.

(Variation and the Like)

As variations or further details for the above-described embodiment, Comments 1 to 6 will be described below. The contents of each Comment can be arbitrarily combined in the absence of a contradiction.

[Comment 1]

Specific values in the above description are used merely as examples, and as a matter of course, those values can be varied.

[Comment 2]

Although an example is described above in which camera shake detector 18 is formed of an angular velocity sensor, camera shake detector 18 may be formed of an acceleration sensor configured to detect an acceleration of imaging device 1 or an angular acceleration sensor configured to detect an angular acceleration of imaging device 1. In this case, a camera shake signal is formed on the basis of an acceleration detected by the acceleration sensor or an angular acceleration detected by the angular acceleration sensor, and a motion vector is calculated on the basis of this camera shake signal and the focal distance. In addition, a motion vector may be calculated on the basis of different physical quantity data indicating the motion of imaging device 1.

[Comment 3]

Although an example is described above in which information indicating the amount of camera shake itself at the time of capturing of an image is stored in image file 25, the present invention is not limited to this. Specifically, information that is to become the base of calculating the amount of camera shake (a motion vector or camera shake signal) may be stored in image file 25, and then the amount of camera shake may be calculated from the information when the amount of camera shake needs to be referenced.

[Comment 4]

An example in which camera shake correction processing (image restoration processing) is performed in imaging device 1 is described above. This camera shake correction processing, however, can be performed in an external device (not shown) of imaging device 1. Specifically, main controller 13, internal memory 14, display unit 15 and camera shake correction processor 23, shown in FIG. 1, are provided to the external device such as a computer, and then, a corrected image can be generated by causing the external device to read information stored in recording medium 16 and then to perform the same camera shake correction processing as the one described above.

[Comment 5]

In addition, imaging device 1 can be implemented as hardware or as a combination of hardware and software. In particular, the functions of main controller 13 and camera shake correction processor 23 can be implemented as hardware, software, or a combination of hardware and software.

In the case where imaging device 1 is formed by use of software, a block diagram regarding a part that can be formed of software represents a functional block diagram of that part. In addition, all of the functions or part of the functions implemented by main controller 13 and camera shake correction processor 23 may be described as a program, and the program may be executed by a program executing unit (a computer, for example), so that the all of the functions or part of the functions can be implemented.

[Comment 6]

In the present embodiment, camera shake correction processor 23 in FIG. 1 functions as a corrected image generation unit for generating a corrected image by subjecting an original image to the camera shake correction processing (shake correction processing). Main controller 13 includes a function as a correction controller for controlling an operation of the corrected image generation unit, and a function as a display controller for controlling display content of display unit 15. The image correction device according to the present invention includes the corrected image generation unit and correction controller, and may further include the display controller.

Each of a plurality of original images stored in recording medium 16 can be considered as an input image for the image correction device and can also be considered as a target image of or a candidate target image of the camera shake correction processing.

In addition, the applicable range of the present invention is not limited to an imaging device. The present invention is broadly applied to an electronics device such as a cellular phone and a personal computer (the electronic device includes the imaging device).

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image correction device comprising:
   a corrected image generation unit configured to generate a corrected image by correcting for shake, on the basis of shake information on a target image, in accordance with a correction instruction issued to the image correction device; and
   a correction controller configured to instruct the corrected image generation unit to correct for shake before the correction instruction is issued, wherein
   the correction controller determines, on the basis of the shake information, whether to perform the preceding correction control for the target image;
   the shake information includes information specifying the amount of shake of an image included in the target image;
   the correction controller determines, on the basis of the amount of shake, whether to perform the preceding correction control for the target image;
   a plurality of input images are sequentially treated as target images;
   the correction controller determines, by comparing the amount of shake specified with a predetermined reference value, whether to execute the preceding correction control for the target image; and
   the reference value is determined by an earlier correction instruction.

2. An image correction device comprising:
   a corrected image generation unit configured to generate a corrected image by correcting for shake, on the basis of shake information on a target image, in accordance with a correction instruction issued to the image correction device; and
   a correction controller configured to instruct the corrected image generation unit to correct for shake before the correction instruction is issued, wherein
   the correction controller determines, on the basis of the shake information, whether to perform the preceding correction control for the target image; and
   the correction controller determines, on the basis of a history of presence or absence of a correction instruction issued for a target image in the past, whether to perform the preceding correction control for a current target image.

3. An image correction device comprising:
   a corrected image generation unit configured to generate a corrected image by correcting for shake, on the basis of shake information on a target image, in accordance with a correction instruction issued to the image correction device;
   a storage unit configured to store a plurality of candidate target images; and
   a correction controller configured to instruct the corrected image generation unit to correct for shake before the correction instruction is issued, wherein
   the correction controller determines, on the basis of the shake information, whether to perform the preceding correction control for the target image; and
   the correction controller receives candidate target images from the storage unit and ranks candidate target images, and regardless of the correction instruction, causes the correction image generation unit to operate on the candidate target images according to their rank sequence.

4. An electronics device, comprising:
   a corrected image generation unit configured to generate a corrected image by correcting for shake, on the basis of shake information on a target image, in accordance with a correction instruction issued to the image correction device;
   a correction controller configured to instruct the corrected image generation unit to correct for shake before the correction instruction is issued;
   a display unit capable of displaying the corrected image; and
   a display controller configured to cause the display unit to display the generated corrected image when the correction instruction is issued while the target image is displayed, wherein
   the correction controller causes, when the target image is displayed, the corrected image generation unit to perform the shake correction processing before the correction instruction is issued;
   the shake information includes information specifying the amount of shake of an image included in the target image;
   the correction controller determines, on the basis of the amount of shake, whether to perform the preceding correction control for the target image;
   a plurality of input images are sequentially treated as target images;
   the correction controller determines, by comparing the amount of shake specified with a predetermined reference value, whether to execute the preceding correction control for the target image; and
   the reference value is determined by an earlier correction instruction.

5. The electronics device as claimed in claim 4, wherein
   the correction controller determines, on the basis of a history of presence or absence of a correction instruction issued for a target image in the past, whether or not to perform the preceding correction control for a current target image.

6. The electronics device as claimed in claim 5, further comprising:
  a storage unit configured to store a plurality of candidate target images,
  wherein the correction controller receives candidate target images from the storage unit and ranks candidate target images, and regardless of the correction instruction, causes the corrected image generation unit to operate on the candidate target images according to their rank sequence.

7. An image correction method executed by a stored program for an imaging device, comprising:
  generating a corrected image from shake information in a target image obtained by the imaging device in accordance with an exogenous correction instruction;
  executing the shake correction before the correction instruction is issued; and
  determining, on the basis of the shake information, whether to correct the target image before the correction instruction is issued; wherein
  the determining step includes:
    treating a plurality of input images sequentially as target images; and
    determining, from previous correction history, whether to perform the preceding correction on the target image.

8. The image correction method as claimed in claim 7, further comprising:
  causing the display unit to display the generated corrected image when the correction instruction is issued while the target image is displayed, wherein
  the shake correction is processed when the target image is displayed, before issuance of the correction instruction.

9. The method as claimed in claim 8, further comprising:
  storing a plurality of candidate target images each being a candidate for the target image;
  receiving candidate target images from the storage unit;
  ranking candidate target images, and
  executing shake correction processing on the ranked candidate target images regardless of the correction instruction.

* * * * *